(12) United States Patent
Brown et al.

(10) Patent No.: US 7,925,627 B1
(45) Date of Patent: Apr. 12, 2011

(54) SYSTEM AND METHOD FOR RECONCILING MULTI-PROTOCOL SCAN RESULTS BY A STORAGE VIRTUALIZATION SYSTEM

(75) Inventors: Ronald Brown, Dunfermline (GB); John Duncan Bankier, Glasgow (GB); Dylan Simon, New York, NY (US); Jie Yu, Santa Clara, CA (US); Srinivas Aji, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 626 days.

(21) Appl. No.: 11/966,733

(22) Filed: Dec. 28, 2007

(51) Int. Cl.
*G06F 7/00* (2006.01)
*G06F 17/30* (2006.01)
(52) U.S. Cl. ........................ 707/634; 707/822
(58) Field of Classification Search .................. 707/600, 707/711
See application file for complete search history.

(56) References Cited

U.S. PATENT DOCUMENTS

2007/0143559 A1* 6/2007 Yagawa ........................ 711/170

\* cited by examiner

*Primary Examiner* — John R. Cottingham
*Assistant Examiner* — Nicholas E Allen
(74) *Attorney, Agent, or Firm* — Dergosits & Noah LLP

(57) ABSTRACT

The present invention is a system and method for reconciling results returned from a multi-protocol scan of a NAS system. Certain NAS systems use different protocols. Some may use the NFS protocol, whereas others may use the CIFS protocol. A scan of the NAS may therefore produce two data object names for a single data object. When a storage virtualization system is tasked with acting as an intermediary between the client and the NAS, these two data object names will cause errors during data migration, synchronization or redirection. The present invention is a method for using the results of a multi-protocol scan of the NAS in order to reconcile data object names that may present differently depending on the protocol applied.

19 Claims, 2 Drawing Sheets

SYSTEM AND METHOD FOR RECONCILING MULTI-PROTOCOL SCAN RESULTS BY A STORAGE VIRTUALIZATION SYSTEM

TECHNICAL FIELD

The present invention relates generally to storage virtualization systems, and specifically, to providing a storage virtualization system with the capability of building a multi-protocol mapping index of data objects.

BACKGROUND OF THE INVENTION

Organizations that rely upon network attached storage ("NAS") systems frequently employ storage virtualization systems to maintain and manage data objects stored in these NAS systems. Data objects may include data files, directories and sub-directories. A typical NAS system may be associated with a client computer connected over a network. The client computer may be used to generate and interact with data objects that are stored on an associated NAS system. Data objects are thereby separated from the client computer so that they may be accessed by other computers on the network.

A storage virtualization system may be placed as an intermediary between the client computer and its associated NAS system or systems. Storage virtualization systems permit data migration, data synchronization and file system mirroring ("storage virtualization operations") from one NAS device ("source server", "source" or "src") to another ("destination server," "destination" or "dst") without interrupting user access to either NAS device. The storage virtualization system ensures that data stored on one NAS device is seamlessly mirrored, moved or synchronized to a second NAS device. In addition, storage virtualization systems are designed to be transparent—the user is not made aware of any changes to the location of his or her data objects. Without storage virtualization, the NAS systems would need to be taken offline before performing storage virtualization operations, thereby denying user access to stored data objects. Since typical data stores are quite large and are constantly in use, the amount of downtime needed to complete such a file transfer can be very disruptive.

Client computers communicate with their associated NAS system by using the same network file system protocol. There are a number of different protocols in use by client computers and NAS devices. Two commonly used protocols include the Network File System ("NFS") protocol, and the Common Internet File System ("CIFS") protocol. Each protocol has its own conventions and syntax that distinguish it from other protocols, from the way the data objects are named, to how the data is managed, to the file attributes associated with each data object.

When a storage virtualization system is added, it will be configured to recognize that same protocol so that there are no incompatibilities to affect data transfer. The storage virtualization system will use NFS operations to transfer data objects from a NFS source server to a NFS destination server, and will use CIFS operations to transfer data objects from a CIFS source server to a CIFS destination server. In some cases, a NAS system may be capable of storing data objects in either protocol, also known as a mixed-protocol or "NFS+CIFS" NAS system. In a mixed-protocol NAS system, even though both NFS and CIFS protocols may be used to access and store data objects, commonly only one protocol will be used. If, however, both protocols are used to store data objects, then data objects stored using the NFS protocol may be separate from the data objects stored using the CIFS protocol. When associating a single or mixed-protocol NAS system with a storage virtualization system, the storage virtualization system will need to be configured to use the proper protocol.

Effective storage virtualization therefore requires complete compatibility with client computers and their associated NAS systems. Even though a storage virtualization system does not store the data objects that it is managing, it must be able to identify, locate and access the stored data objects. If the storage virtualization system cannot recognize or use the same protocol as either the client computer, the source NAS server or the destination NAS server, then there could be a significant risk of data loss or data corruption. Further, the storage virtualization may not be able to perform its operations.

While it is probably ideal for an organization to rely on a single protocol for its NAS systems, it is more common for an organization to use NAS systems with different protocols. This presents a problem for storage virtualization systems, because the different protocols are not cross-compatible. As such, the differences between protocols complicates the transfer of data objects from a NFS device to a CIFS device, and vice versa. This may effectively restrict the ability of the storage virtualization system to perform its functions and may prevent efficient data management. With organizations merging NAS systems or upgrading NAS systems, problems with incompatible network file system protocols are on the rise.

What is therefore needed is a way for storage virtualization systems to manage data objects on associated NAS systems regardless of the protocol used. What is a needed is a way to discover the stored data objects and build a mapping index of the stored data objects. What is further needed is way to ensure that any incompatibilities between the different protocols is resolved so that data objects stored in the mapping index may be referenced without regard to the protocol used.

BRIEF DESCRIPTION OF THE FIGURES

The present invention is illustrated by way of example and not limitation in the figures of the accompanying drawings, in which like references indicate similar elements, and in which.

DETAILED DESCRIPTION OF THE INVENTION

The present invention provides a system and method for ensuring data object access is consistent across multiple network file system protocols. The present invention enables a storage virtualization to use the results of a multi-protocol scan to build a mapping index of stored data objects that resolves any incompatibilities or inconsistencies uncovered from the multi-protocol scan. Using aspects of the present invention, a storage virtualization system tasked with managing data objects between at least two NAS systems will be able to retain client access to the correct data object, regardless of the protocol used.

It should be appreciated that the present invention can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

1. The Storage Virtualization System

In an embodiment of the present invention, the storage virtualization system is either directly connected or connected over a network to at least two NAS devices, one of which is NFS compatible, and the other is CIFS compatible. One will appreciate that other combinations of protocols are possible and work equally well with the present invention, and that the illustrative example is not meant to be limiting in any way.

Figure 1:
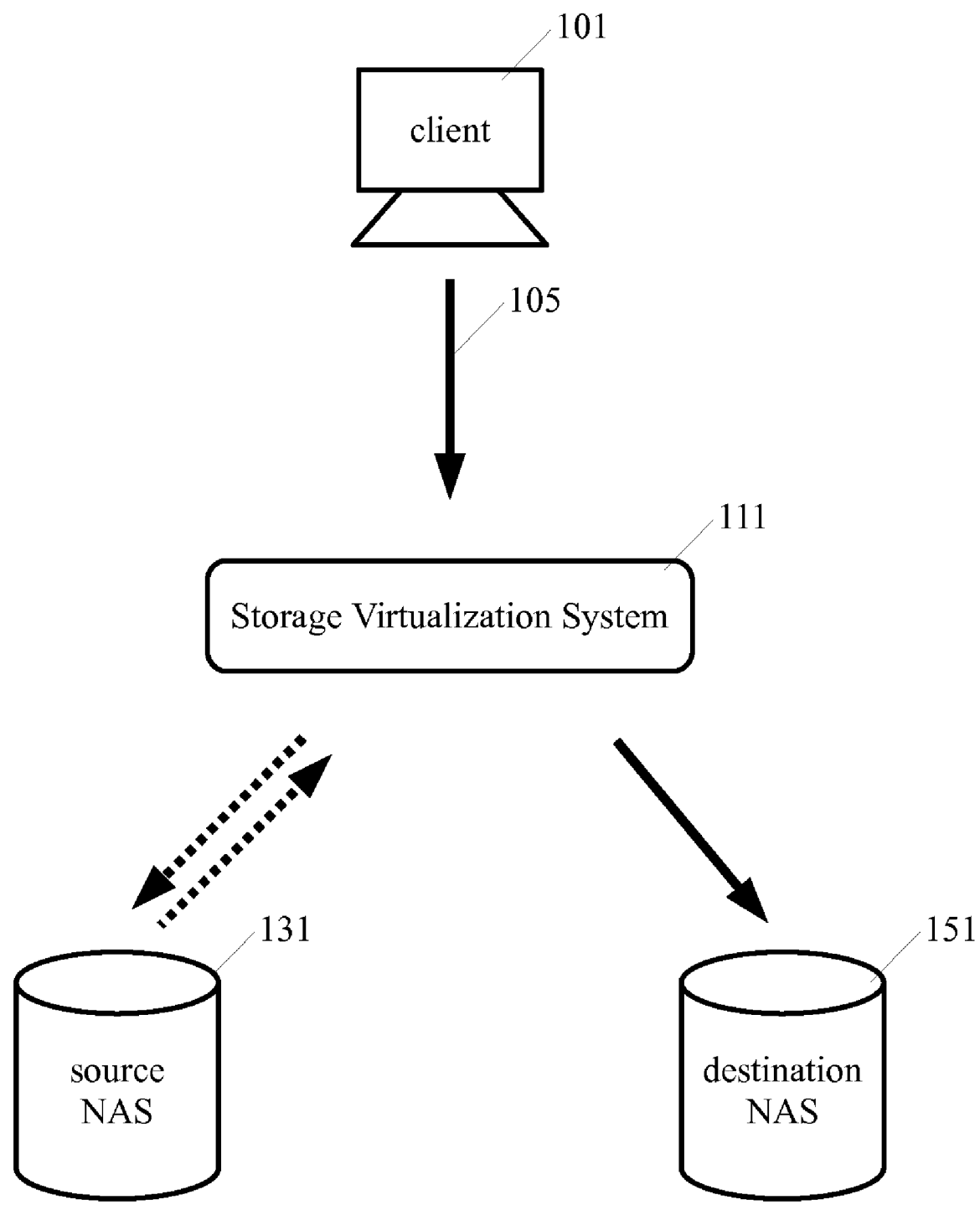
FIG. 1 is an exemplary block diagram depicting the elements of a storage virtualization system, according to an embodiment of the present invention.

The storage virtualization system may be placed as an intermediary between a source NAS server and a destination NAS server. FIG. 1 illustrates one exemplary setup for a storage virtualization system. A client computer 101 accesses a source NAS system 131 connected to a network 105. The storage virtualization system 111 is an intermediary that may cause data from the source NAS system 131 to be re-directed, migrated or synchronized to a destination NAS system 151. One will appreciate that FIG. 1 is merely an example of how a storage virtualization system 111 might interact with a source NAS system 131 and a destination NAS system 151, and that other setups are possible without departing from the scope of the present disclosure.

In FIG. 1, source NAS system 131 may either utilize the NFS, CIFS or may be a mixed NFS+CIFS protocols. Similarly, destination NAS system 151 source NAS system 131 may either utilize the NFS, CIFS or may be a mixed NFS+CIFS protocols. In an embodiment of the present invention, storage virtualization system 111 may have access to or may internally store a multi-protocol mapping index built using the method described below. The mapping index may built using the results of a multi-protocol scan performed by the storage virtualization system or some other component of the NAS system. The scan results may include a listing of the data object names, file attributes, times of creation, times of last access, metadata, hardlink information, softlink information or other such information for data objects stored in the scanned NAS system. The present invention may instruct the storage virtualization system to use this information to perform heuristics and match up the results of each protocol scan to build the mapping index. As a result, the mapping index may be used to locate, monitor and access data objects on any associated and scanned NAS system regardless of protocol.

2. The Multi-Protocol Scan

In order to discover the data objects stored in a NAS system associated with the storage virtualization system, the storage virtualization system may perform a scan of the associated NAS system. A multi-protocol scan may be useful, since the results may uncover data objects and attributes not found in a single-protocol scan. This is because a multi-protocol scan may be comprised of separate or simultaneous scans in different protocols. For example, in an embodiment where two scans are used, a first scan may be a NFS query, and the second scan may be a CIFS query. Alternatively, the first scan may be a CIFS query and the second scan may be a NFS query. The scans may be simultaneously performed as well as sequentially performed, but one will appreciate that a single multi-protocol scan may be comprised of separate scans in the different protocols. The computer instructions for the multi-protocol scan and the results of the scan will be discussed further below.

Figure 2:
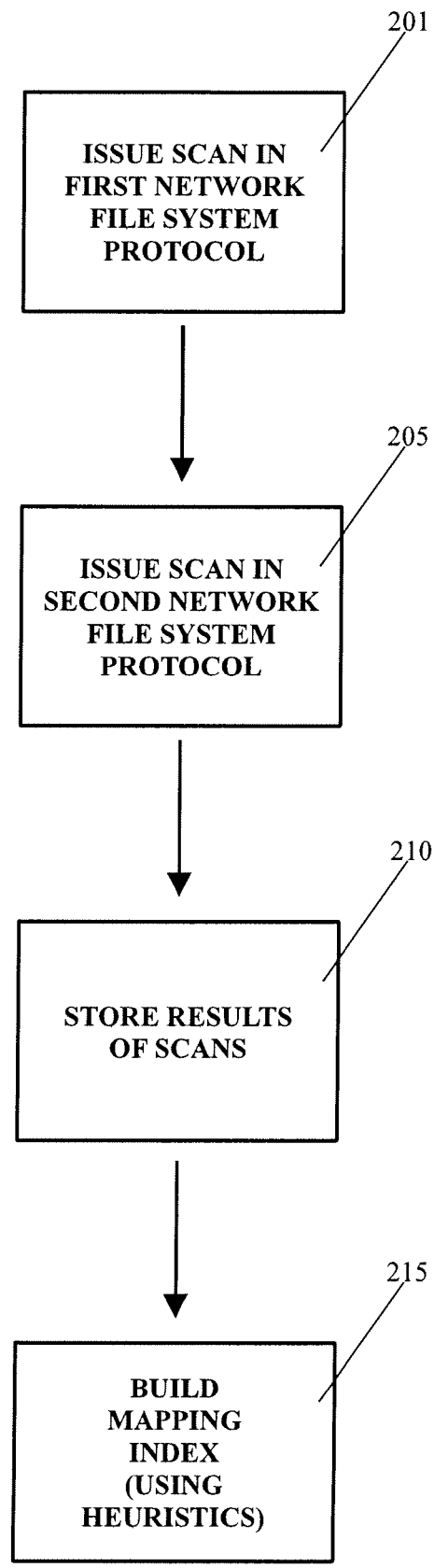
FIG. 2 is an exemplary flow diagram illustrating the steps of an embodiment of the present invention.

FIG. 2 illustrates a possible series of steps for performing the multi-protocol scan by the storage virtualization system 111. As noted above, a storage virtualization system 111 may perform these steps upon association with or connection to a source NAS 131. In another embodiment, these steps may be performed after the source NAS 131 has been associated or connected to the storage virtualization system 111, or the steps may be repeated as necessary to ensure scan results are up to date. In yet another embodiment, the steps may be user-initiated.

As shown in step 201 of FIG. 2, the storage virtualization system 111 may issue a computer instruction or command to scan the contents of the source NAS system 131. One will appreciate that the command may be issued by a daemon or other semi-automated software application within the storage virtualization system 111. The command may also be issued by a user, or as part of a routine automated system task. If the storage virtualization system 111 is issuing a NFS command, then the command may be "READDIR" or "READDIRPLUS" or the equivalent. If the storage virtualization system 111 is issuing a CIFS command, then the command may be "FindFirst2" or "FindNext2" or the equivalent. One will appreciate that there are a number of equivalent commands that may be used to scan the NAS system 131, so long as the command is intended to elicit a listing of data objects or information about the data objects stored in NAS system 131.

After issuing a first command to scan NAS system 131 using a first protocol in step 201, the storage virtualization system 111 may issue a second command to scan NAS system 131 using a second protocol in step 205. For example, if the storage virtualization system 111 issued a first scan command in NFS, then the second scan command may be in CIFS. Similarly, if the storage virtualization system 111 issued the first scan command in CIFS, then the second scan command may be in NFS. One will appreciate that other protocols may be used besides NFS and CIFS, and that more than two scans may be performed. One will also appreciated that a NFS and a CIFS scan of NAS system 131 may occur simultaneously. The results of the multi-protocol scan may then be stored within storage virtualization system 131 for future use (step 210 of FIG. 2).

One will appreciate that the results of the multi-protocol scan or scans will be returned to the storage virtualization system and stored for later use. The results may be stored temporarily or permanently. The results may be in the form of an index, data structure, or may resemble the information returned upon issuance of a "ls-l" command on a UNIX system, or a "dir" command on a Windows® system. In most cases, the scan results will comprise a listing of the names or identifiers ("FIDs") for the data objects stored in the NAS system, as well as the file attributes, directory or sub-directory relationships, and the path address for each data object.

In an embodiment, results from a scan of NAS system 131 using a first protocol are received and stored, then results from a scan of NAS system 131 using a second protocol are received and stored. One may also envision that if NAS system 131 is being scanned using the first and second protocol at the same time, then scan results may be received simultaneously or near simultaneously, and then stored. One will appreciate that the sequence of when scan results are received and stored may vary. One will also appreciate that the format of the received scan results may vary. The present invention provides software instructions for the storage virtualization system to issue the scans and store the received results.

One will appreciate that in the above examples and in FIG. 2, the steps of the multi-protocol scan are performed upon a source NAS system, such as NAS system 131. The multi-protocol scan may be performed upon any NAS associated with storage virtualization system 111, including destination NAS system 151. The results from a multi-protocol scan of destination NAS system 151 may also be stored by the storage virtualization system 111.

3. The Multi-Protocol Mapping Index

The multi-protocol mapping index aspect of the present invention may be created after receiving the results of the multi-protocol scan. In an embodiment where the multi-protocol scan is comprised of a first scan in NFS and a second in CIFS (or vice-versa), the storage virtualization system 111 receives the results of each scan, stores the results, then uses the results to build a mapping index (step 215). Alternatively, the storage virtualization system may start building the mapping index as soon it receives the results from the first scan. The remainder of the mapping index may be built once the storage virtualization system receives the results from the second scan.

In an embodiment where both scans are performed simultaneously, the storage virtualization system may build the mapping index after the results from both scans are received. One will appreciate that the present invention will enable a storage virtualization system 111 to issue more than two scan commands in differing protocols, so long as the results are received by the storage virtualization system 111 and used to build the mapping index (step 215).

Building the mapping index may comprise taking the results of each scan and storing the results in a new data structure or part of an existing data structure. Since each scan will have been performed on the same NAS system, each scan will produce a listing of the same data objects. However, one listing will be in one protocol, and the other listing will be in the other protocol. The present invention will enable the storage virtualization system to combine the results of each scan such that later reference to a data object by a client computer will be understood no matter what protocol is used. The manner in which the results from each scan may be combined is discussed further below.

3. Incompatibilities Between NFS and CIFS

The results of the multi-protocol scan may not be sufficient to ensure that data objects are accessible regardless of protocol. As such, combining scan results may not be a trivial matter. There may be inconsistent results from each scan that may require reconciling the results of a first scan using one protocol and the results of the second scan using another protocol. In order to understand various aspects of the present invention, it may be helpful to understand some of the specific incompatibilities between the NFS and CIFS protocol. One will appreciate that the following examples are merely illustrative and are not meant to be limiting in any way.

a. Case Sensitivity Differences Between NFS and CIFS

The NFS and CIFS protocols differ in their treatment of capitalized letters in data object names, also known as "case sensitivity". Lowercase letters are treated the same in both protocols. For example, if the source NAS system contains a data object having the name "abc.txt", then both NFS and CIFS protocols will recognize that data object as "abc.txt". As such, the storage virtualization system will be able to refer to the data object as "abc.txt" and both a NFS and a CIFS NAS system will recognize it. If, however, the source NAS server has another data object named "ABc.txt", this data object may appear as two data objects after a multi-protocol scan. The NFS scan may correctly identify the data object as "ABc.txt", since the NFS protocol is case-sensitive.

To the contrary, CIFS is case-insensitive. If the CIFS scan has already identified an occurrence of the data object "abc.txt", it may not accept a second data object with these same letters, even if some or all of the letters are capitalized. In order to prevent confusion in CIFS between the abc.txt and the ABc.txt data objects, the storage virtualization system may change the name of the "ABc.txt" data object to "abc~2.txt" or "ABc~2.txt". As a result, when the storage virtualization routes a CIFS client computer request for the "ABc.txt" data object, this request may incorrectly route to the "abc.txt" data object or may be denied because "ABc.txt" will not be properly recognized. The client computer may receive an "access denied", "file not found" or "path not found" response, or no response at all.

This problem may be compounded if the storage virtualization system is synchronizing data objects between the source NAS system and a destination NAS system. Because its name is lower-cased, the "abc.txt" data object may synchronize properly, but the mixed case "ABc.txt" data object may not. While the NFS protocol is case-sensitive and able to recognize both files properly, the CIFS protocol may cause the assignment of the name "ABc~1.txt" to "ABc.txt". This will result in a data object mismatch, and the ABc.txt will not be properly synchronized between the source and destination servers.

b. Special Character Recognition Between NFS and CIFS

Other errors in storage virtualization operations can occur when a data object has a name that includes certain special characters. For example, it is well known that certain characters may be used in NFS data file names, but not in CIFS file names. For example, the NFS protocol recognizes special characters such as the colon (":") or backslash ("\") symbol in data object names. The CIFS protocol does not. When performing a multi-protocol scan of a NAS system having data objects with special characters in the data object name, the NFS scan will produce accurate results, but the CIFS scan will not. For example, if a data object called "colon:some_thing.txt" is stored on a NFS NAS system, the NFS portion of a multi-protocol scan of the NFS NAS system will correctly identify that data object. However, the CIFS portion of the multi-protocol scan will result in an error because the CIFS scan will not recognize the data object. The storage virtualization system may then assign a different name to that data object, such as "colon_some_thing~1.txt". As a result, during a storage virtualization operation, the storage virtualization system will not be able to access the "colon:some_thing.txt" data object on the destination server using the CIFS protocol because the name was changed to to "colon_some_thing~1.txt". This discordance will cause problems during storage virtualization operations and will result in error messages such as "file not found", "access denied", or the like. As such, storage virtualization may fail.

For NAS systems having data objects with names recognized by both protocols, a multi-protocol scan may not present with any issues for storage virtualization operations. However, for NAS systems storing data objects with names only recognized by one protocol, multi-protocol scans by a storage virtualization system may lead to storage virtualization failure. In order to reconcile the results of the multi-protocol scan, and ensure that the mapping index built from the multi-protocol scan results is accurate, the present invention may cause a storage virtualization system to perform certain matching functions, also known as "heuristics."

4. The Common Root Directory Starting Point

In an embodiment of the present invention, in order to perform the matching functions, the storage virtualization system will identify a common root directory that will act as a starting point on the NAS system. This starting point may be identified before any scanning begins. Identifying a common root directory allows the matching function to begin from a chosen known location on the NAS system. The identification step may be performed by a daemon or other software instruction run by the storage virtualization system. Alternatively, identifying the common root directory may be performed by the user.

Once identified, the next step may be for the storage virtualization system to navigate to that root directory using each protocol. In the NFS protocol, data objects may be identified by a file handle and located using an absolute path address. Therefore, for NFS NAS systems, the file handle and/or the absolute path address for the starting point root directory will be needed. The absolute path address may also help determine the specific mount point to use. In order to gain this information, the storage virtualization system may issue a READDIRPLUS or equivalent command. In the CIFS protocol, data objects may be referred to by shares, which may be located by absolute or relative path addresses. While an absolute path address might show the full location address for the data object, a relative path address may a concatenated or shortened path address. As such, the storage virtualization system will need to discover the best path address to use in order to access the selected common root directory. After discovering this information in both NFS and CIFS, the absolute path information for the common root directory may then be translated into a share relative path that may be used. As such, the present invention will be able to identify the NFS and CIFS name for the starting point, as well as the NFS and CIFS location identifier/path address for the starting point.

Once the common root directory and its proper path address are identified as a common starting point for both the NFS and CIFS scans, the corresponding NFS and CIFS scans may be issued by the storage virtualization system, and the results of those scans may be tracked and matched to build the data structure aspect of the present invention. The present invention will be able to trace scan results from the common root directory, and thus be able to build directory tree of the interrelationships between the data objects stored on the NAS being scanned. In order to prevent changes to the directory tree during scanning, in one embodiment the present invention may cause the storage virtualization system to block client access to the root directory, or the NAS system. Blocking will additionally prevent changes from being made to the data objects on the NAS system before the scans and matching steps are complete. In another embodiment, blocking may be partial, unblocking portions of the NAS system as soon as those portions are scanned and matched by the present invention.

5. Data Object Matching or "Heuristics"

Data object matching may be accomplished by a number of different methods as described below. As noted previously, the present invention uses attributes discovered during each respective protocol's scanning process in order to match the results from each scan. These data object attributes aids the matching functions of the present invention. The matching functions may include: (a) matching by order; (b) matching by data object name; (c) matching by data object attributes; (d) matching by setting data object attributes; and/or (e) grouping unknown data objects. One will appreciate that these matching methods are merely exemplary, and that this list and the following examples are not meant to be exhaustive or limiting in any way. In addition, these functions may be combined or parsed in order to meet the objectives of the present invention.

a. Matching by Order

Each scan of a multi-protocol scan may produce a list of the order in which the data objects are stored on the NAS system. Presumably, the lists from each scan will contain data objects listed in the same order since they both reflect only the order in which the data objects are stored on the NAS system. For example, the first data object returned by a NFS scan may be the same first data object returned by a CIFS scan. Further, the fifth data object returned by the NFS scan may also be the fifth data object returned from the CIFS scan. It is a function of some storage virtualization systems or NAS systems to guarantee that the scan results in response to the READDIRPLUS and Transaction2 FindFirst2/FindNext2 commands be in the same order. As such, matching by order may simply require matching entries in the order that the results are returned. Using this method, the present invention builds the data structure as scan results are returned or after all scans results have been returned.

b. Matching by Name

Another aspect of the present invention enables matching using data object names. The present invention may cause the storage virtualization to read some or all letters of a data object name or identifier in order to match scan results. For example, if a data object identified from a NFS scan has a name or identifier that is similar to a data object returned from a CIFS scan, then the present invention may match these two names and identify them as a single data object. However, as noted above, this type of matching may require resolution of data object names that are not recognizable in different protocols. For example, some special characters and capitalization of letters is acceptable in NFS data object names, but are not recognized in CIFS. In addition, some UNICODE characters in CIFS do not map to ASCII NFS names. In these scenarios, the storage virtualization system may generate a name that is recognizable in all protocols. These generated names may or may not bear relation to the original filename. For example, the generated name may use encoded inode numbers rather than a text string or other user-readable label. In any event, the present invention will match some of the characters of the data object names in order to cause a match, or may substitute characters in order to create a name that is recognizable in multiple protocols.

c. Matching by Examining Attributes

In some instances, neither name matching or order matching will be sufficient to reconcile scan results. The present invention may then rely upon data object attributes to find matches. As noted above, each data object entry returned by the READDIRPLUS and Transaction2 FindFirst2/FindNext2 commands may also contain data object attributes associated with that entry. Alternatively, the storage virtualization system may issue the GETATTR command for each data object in order to gather all the data object attributes available for data objects on the scanned NAS system. These attributes may include a data object's size, creation time, last access time, modify time, etc. It is unlikely that two data objects will share the exact same values for some or all of these attributes. For example, if the scans result in two data objects with the exact same size, creation time, last access time and modification time, the present invention will cause the storage virtualization system to deduce that these two data objects may in fact be the same data object. The present invention will cause the storage virtualization system to match these two results and store the information in the data structure.

d. Matching by Setting Attributes—"Active Matching"

For each remaining scan result that cannot be matched using the previously-described matching methods, the present invention may enable the storage virtualization system to assign temporary substitute data object attributes. For example, the remaining unmatched data objects may be assigned a unique value generated by the storage virtualization system. This unique value may be used to substitute for a single data object attribute, such as creation time, or may be used to substitute for a number of data object attributes. The present invention then causes the storage virtualization system to issue the READDIRPLUS and Transaction2 Find-First2/FindNext2 commands again. The results of this second iteration of scans may be analyzed by the storage virtualization system to search for those previously assigned unique values, which may then be used to match data objects. After matching is successfully completed, the data object's file attributes are restored.

This method of substituting unique values for data object attributes may also be applied to data object names. For example, rather than substituting a data file attribute, the present invention may cause the storage virtualization system to rename unmatched data objects using a database of pre-set substitute names. Upon re-scanning, the storage virtualization will look for only the re-named data objects, and thus have a smaller pool of data objects to match. Once matched, the data object names may be restored. One will appreciate that many different combinations of substitutions may be possible in order to match those data objects not matched using the above methods.

e. Grouping Unknown Files

In some storage virtualization systems, data object names and/or attributes may not permit modification. As such, the above Active Matching method may not work. In these instances, the present invention may cause the storage virtualization to aggregate unmatched data objects from the multi-protocol scan into an "unknown group." The present invention may enable the storage virtualization system to treat this unmatched data objects as a single entity, performing storage virtualization operations on the unknown group as a single entity. This may permit a user or administrator to manually match data objects, since human intervention may be the only way to reconcile multi-protocol scan results. Further, the present invention will allow a user to correct mismatched data objects in order to ensure proper management of these data objects.

Once scan results are matched using any or all of the above matching methods, the data structure that is produced may reside in the storage virtualization system or separate from the storage virtualization system for future access. Alternatively, as noted previously, this data structure can form part of the multi-protocol mapping index accessed by or stored in the storage virtualization system. One will appreciate that the present invention may cause the storage virtualization system to match multi-protocol scan results using a first matching function, and may then apply a second or third matching function in order to verify results. The storage virtualization system may also update the data structure upon demand, or according to a pre-set schedule. The advantage of the present invention is that it prevents errors that result from data object name mis-match during multi-protocol scanning.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto. For example, the present invention is described herein for a storage virtualization system having access to scan results from a combination of CIFS and NFS scans. One will appreciate that the present invention will apply to a storage virtualization system accessing scan results from other protocols as well.

What is claimed is:

1. A method for mapping data comprising:
providing a storage virtualization system connected to a network addressed storage (NAS) system, the NAS system having a plurality of stored data objects;
scanning the plurality of stored data objects using a first network file system protocol to generate first scan results;
scanning the plurality of stored data objects using a second network file system protocol to generate second scan results;
matching the first scan results with the second scan results; and
storing matched results on the storage virtualization system.

2. The method of claim 1, wherein the first network file system protocol is NFS and the second network file system protocol is CIFS.

3. The method of claim 1, wherein the first network file system protocol is CIFS, and the second network file system protocol is NFS.

4. The method of claim 1, wherein the first scan results comprise a first list of the order in which the plurality of data objects are stored on the NAS system and the second scan results comprise a second list of the order in which the plurality of data objects are stored on the NAS system.

5. The method of claim 1, wherein the first scan results comprise a first list of file identifiers for the plurality data objects and the second scan results comprise a second list of file identifiers for the plurality of data objects.

6. The method of claim 1, wherein the first scan results comprise a first list of attributes for the plurality data objects and the second scan results comprise a second list of attributes for the plurality of data objects.

7. The method of claim 1, wherein the matched results are stored in a mapping index on the virtualization system.

8. A computer program product, comprising a non-transitory computer usable medium having a computer readable program code embodied therein, the computer readable program code adapted to be executed to implement a method for mapping data, the method comprising:
scanning a NAS system using a first network file system protocol to generate first scan results;
scanning the NAS system using a second network file system protocol to generate second scan results;
matching the first scan results with the second scan results; and
storing matched results.

9. The computer program product of claim 8, wherein the first network file system protocol is NFS and the second network file system protocol is CIFS.

10. The computer program product of claim 8, wherein the first network file system protocol is CIFS, and the second network file system protocol is NFS.

11. The computer program product of claim 8, wherein the first scan results comprise a first list of the order in which the plurality of data objects are stored on the NAS system and the second scan results comprise a second list of the order in which the plurality of data objects are stored on the NAS system.

12. The computer program product of claim 8, wherein the first scan results comprise a first list of file identifiers for the plurality data objects and the second scan results comprise a second list of file identifiers for the plurality of data objects.

13. The computer program product of claim 8, wherein the first scan results comprise a first list of attributes for the plurality data objects and the second scan results comprise a second list of attributes for the plurality of data objects.

14. The computer program product of claim 8, wherein the matched results are stored in a mapping index.

15. A method for mapping data comprising:
provinding a storage virtualization system connected to a network addressed storage (NAS) system, the NAS system having a plurality of stored data objects;
scanning the plurality of data objects using a first network file system protocol to generate first scan results;
scanning the plurality of data objects using a second network file system protocol to generate second scan results;
storing the first scan results and the second scan results on the storage virtualization system;
matching the first scan results with the second scan results; and
storing matched results on the storage virtualization system.

16. The method of claim 15, wherein the first scan results comprise a first list of the order in which the plurality of data objects are stored on the NAS system and the second scan results comprise a second list of the order in which the plurality of data objects are stored on the NAS system.

17. The method of claim 15, wherein the first scan results comprise a first list of file identifiers for the plurality data objects and the second scan results comprise a second list of file identifiers for the plurality of data objects.

18. The method of claim 15, wherein the first scan results comprise a first list of attributes for the plurality data objects and the second scan results comprise a second list of attributes for the plurality of data objects.

19. The method of claim 15, wherein the matched results are stored in a mapping index.

\* \* \* \* \*